United States Patent [19]

Eastwood

[11] Patent Number: 4,696,867

[45] Date of Patent: Sep. 29, 1987

[54] ALUMINUM BASED BEARING ALLOYS

[75] Inventor: Barry J. Eastwood, Aylesbury, England

[73] Assignee: AEPLC, Rugby, England

[21] Appl. No.: 583,198

[22] Filed: Feb. 24, 1984

[30] Foreign Application Priority Data

Jul. 5, 1983 [GB] United Kingdom ............... 8318156

[51] Int. Cl.$^4$ .............................................. B32B 15/20
[52] U.S. Cl. ................................. 428/650; 148/11.5 Q; 148/438; 420/530; 428/652; 428/653; 428/654
[58] Field of Search ............... 420/530; 428/653, 650, 428/652, 654; 148/2, 11.5 A, 11.5 Q, 438

[56] References Cited

U.S. PATENT DOCUMENTS 2,473,060  6/1949  Hunsicker et al. ............... 420/530
4,278,740  7/1981  Nara et al. ........................ 428/653

*Primary Examiner*—R. Dean
*Attorney, Agent, or Firm*—Price, Heneveld, Cooper, DeWitt & Litton

[57] ABSTRACT

An alloy for use as a bearing lining on a metal backing comprising, by weight, 1 to 11% silicon, 8 to 35% tin, and 0.2 to 3% copper, the balance being aluminum. The lining is first cast as a billet annealed, cold rolled, annealed and cold rolled a second time and then bonded to the metal backing. The lining optionally carries a soft overlay.

11 Claims, No Drawings

ALUMINUM BASED BEARING ALLOYS

BACKGROUND OF THE INVENTION

The present invention relates to aluminium alloys for use as bearing materials, for example for use in internal combustion engines.

For these applications, one known bearing material is Al Sn20% Cu1%. This is a widely used bearing material having good fatigue strength and seizure resistance, and being able to perform happily against forged steel and cast iron journals without the use of an electroplated overlay. Changes in engine design have resulted in the increased use of turbocharged petrol engines and high speed diesel engines for automotive applications. This has provided a requirement for a bearing alloy capable of being used against forged steel and cast iron crankshafts without an electroplated overlay with a higher fatigue rating than Al Sn20 Cu1.

Good anti-seizure properties and high fatique strength are conflicting requirements in an engine bearing alloy, since the latter is associated with high hardness and the former is associated with low hardness.

One known high strength bearing alloy is Al Si11% Cu1% in which the silicon is finely and uniformly distributed. The anti-seizure properties of this alloy derive from the uniform dispersion of fine silicon particles and the presence of the copper; both these elements help to provide a degree of fatigue strength. The high fatigue strength is still further increased by the provision of an electroplated overlay of lead/tin over a nickel or copper/zinc interlayer.

This Al Si11 Cu1 alloy has become well established commercially as the lining of steel backed crankshaft bearings in internal combustion engines, particularly high speed diesel engines.

However, the high silicon content renders the alloy unsuitable for bore broaching techniques which can be very much more economical as a mass production technique than the use of conventional boring machinery.

SUMMARY OF THE INVENTION

It is an object of the present invention to provide such a bearing material having an increased fatigue strength while still exhibiting good anti-seizure properties, good conformability, good compatability, and good dirt embedability.

"Conformability" is the term given to the ability of a bearing lining to accept small misalignments between itself and the rotating member, while "compatability" is the ability to resist local welding between the bearing alloy and the counterface in regions of asperity contact during rubbing.

It is a further object of the invention to provide a bearing material which, with an overlay can provide a very high degree of fatigue strength but which can be mass produced at lower cost.

According to the present invention there is provided an alloy comprising from 1 to 11% silicon by weight, from 8 to 35% tin by weight and from 0.2 to 3% copper by weight, the balance being aluminium (and incidental impurities associated with the aluminium).

The silicon content is preferably from 2 to 8%, more preferably from 3 to 5%, for example 4% by weight. The tin content is preferably from 8 to 20%, for example 10 or 11% by weight, and the copper content is preferably 0.5 to 2% for for example 1% by weight.

It has been found that alloys in accordance with the invention meet the above objective and possess the necessary attributes in respect of fatigue strength, anti-seizure properties, compatability and conformability, and embedability. Preferably, the tin in the alloy is reticular. "Reticular" as applied to an aluminium/tin alloy refers to one in which the aluminium and tin phases are both continuous, the tin phase being continuous along the aluminium grain edges or trigonal boundaries. The silicon is preferably in particulate form in the alloy and a large proportion e.g. about 60% is substantially incorporated or encapsulated within the tin phase. It is believed that the good properties of bearings in accordance with the invention may possibly only be obtained when the tin is reticular and incorporates the silicon. The question of silicon particle size is important for proper seizure resistance. Particles should preferably not exceed 20 microns and are more preferably all less than 4 microns. In fact, it may be desirable to include in the alloy a small quantity e.g. 0.05% of strontium or a small qunatity e.g. 0.05% of sodium so as to modify the silicon eutectic and reduce the particle size.

With a tin content of at least 8%, the alloy cannot easily be hot-rolled without the risk of the tin being squeezed out. Thus, a silicon content approaching 3 to 5% by weight is preferred since such an alloy has been found to be capable of being cold rolled and it can also be machined easily. In particular bore broaching is possible. Furthermore, where normal cutting tools are used for materials in accordance with the invention, for example for applications other than bearings, wear on the tools may be reduced.

The invention also extends to the novel bearing alloy described above bonded to a backing either in the form of a strip of bearing material or as formed bearings. The backing is preferably of steel or aluminium or aluminium alloy, though where a steel backing is used, an aluminium or aluminium alloy foil layer is used between the steel and the bearing alloy to assist in bonding. The bearing may be formed directly or first formed as a blank and subsequently formed into the desired shape.

DESCRIPTION OF THE PREFERRED EMBODIMENTS

In order to assess the fatigue strength, a bearing having a lining in accordance with the present invention was tested under dynamic loading conditions running against a shaft to which eccentrically positioned weights were attached. The material in accordance with the invention was an alloy comprising Al Si4 Sn11 Cu1 and this was compared with two existing alloys, namely, Al An20 Cu1 and Al Si11 Cu1. After 20 hours at a specific load of 2980 lbf/in$^2$, the bearing in accordance with the invention showed no fatigue failure while the two hearings having linings of the known materials had both failed.

Regarding compatability, a bearing bush having a lining in accordance with the invention was tested against one lined with the known Al Sn20 Cu1 alloy. In the test, a cylindrical bush ⅝ inch (1.6 cm) diameter ¾ inch (1.9 cm) in length was located on a shaft. The shaft was rotated at 1500 rpm for 1½ minutes under lubrication and then left stationary for 4½ minutes to allow the lubricant to be squeezed out of the loaded area of the bearing. The test cycle consisted of repeating this sequence 10 times. The test cycle was repeated with different upward loads applied to the bush, then further tested for 1300 test cycles at maximum load. The results are summarised in Table 1.

TABLE 1

| | Load in N/mm² at seizure | | | | | 1300 cycles at 15 Nmm² |
|---|---|---|---|---|---|---|
| Alloy | 3 | 6 | 9 | 12 | 15 | seizure Survived |
| Al Sn20 Cu1 | | 3 | 2 | 1 | | |
| Al Si4 Sn11 | | | 2 | | | 4 |

Six samples of each material were tested and as can be seen from Table 1, the compatibility of the material in accordance with the invention showed much improvement.

A material in accordance with the invention was also tested against two known materials to assess the relative seizure resistance.

Thus, "Sapphire" seizure tests have been carried out to compare the performance of Al Sn11 Si4 Cu1, Al Sn20 Cu1 and Cu Pb25 Sn1.5 against nodular cast shafts. The Cu/Pb bearings were plated with 5 μm Ni and 5 μm PbSn and heat treated at 160° C. for 100 hours before test. This was done to simulate the condition of an overlay plated bearing after many hours of running in an engine.

The Sapphire seizure test was carried out on a Sapphire test rig under the following conditions:

1. The bearings were machined to half length to facilitate the use of higher specific loads than can normally be obtained on full size bearings.
2. The lubricating oil (SAE10) was preheated to 120° C.
3. The rig was run for 1 hour at 100 MPa.
4. The load was increased by 20 MPa and the rig run for 10 minutes at the new load. This procedure was repeated until seizure occurred or the back of the bearing temperature rose rapidly to above 160° C.

The load at which seizure occurred is the Sapphire seizure rating.

The results are shown in Table 2

TABLE 2

| | Seizure Load (MPa) | |
|---|---|---|
| | Nodular Cast Iron Shafts | Steel Shaft |
| (AlSn11Si4Cu1) | 240 | 250 |
| (AlSn20Cu1) | 140 | 230 |
| (CuPb25Sn1.5) | 120 | 140 |

Each of the above results is the mean of several tests. From the results it is concluded that the material in accordance with the invention is more seizure resistant than AlSn20Cu1 particularly when operating against a nodular cast iron counterface. The CuPb25Sn1.5 bearings seized when the overlay was lost by wear.

It has been suggested in some prior art references that other additions such as chromium or manganese might be added to this general type of bearing material in order to increase its strength. However, it is believed that in the case of the present invention, these additions could well interface with the reticulation of the tin phase, and as a consequence lower the fatigue strength.

When a very high strength bearing alloy is required for example for use with turbocharged engines and larger high speed diesel engines the bearing layer in accordance with the invention may be overlay plated with a soft overlay. The overlay preferably comprises a lead-based alloy such as lead/tin or lead/tin/copper, or tin/antimony, or tin/antimony/copper, or a combination of the metals, lead, tin, antimony and copper. Underneath the overlay, there may be an interlayer of any one of the following: nickel, iron, silver, cobalt, copper zinc or copper tin. These may help to prevent diffusion of constituents of the overlay into the aluminium alloy.

Table 3 shows examples of preferred alloy compositions in accordance with the invention. The figures are all weight percentages and the balance in each case is aluminium. In all cases, about 60% of the silicon is substantially contained within the tin phase

TABLE 3

| | Silicon | Tin | Copper |
|---|---|---|---|
| A | 1 | 9 | 0.5 |
| B | 1 | 30 | 1 |
| C | 2 | 20 | 1 |
| D | 4 | 10 | 1 |
| G | 4 | 11 | 2 |
| E | 8 | 8 | 3 |
| F | 8 | 35 | 3 |

Preliminary tests suggest that, of the examples shown in the table, alloy compositions D, C, E and G exhibit the more favourable properties. Of these, composition D is the most preferred, followed by composition G.

The invention will now be illustrated by comparing one method of preparing a steel-backed bearing strip for forming bearings having a lining in accordance with the invention, with a known method for forming a similar strip having a lining of Al Sn20 Cu1.

In the case of the known alloy, a rectangular billet is first cast having a thickness of 25 mm. The billet is cut to lengths of 600 mm, the edges removed by sawing, and annealed at 350° C. for 3 hours. The surfaces of the billet are then machined so as to reduce its thickness to 19 mm. This is then clad on each face with a 1.5 mm thick layer of aluminium foil taking the overall thickness back to 22 mm. Next, the strip is cold rolled (to minimise tin exudation) down to 0.89 mm in a number of stages. Typical stages are 11 mm, 7.76 mm, 5.09 mm, 3.55 mm, 2.49 mm, 1.93 mm, 1.49 mm, 1.14 mm, and 0.89 mm, at which stage the strip is trimmed and bonded to the steel backing.

In the case of the alloy according to the invention, it is necessary to break up the silicon to make the material more ductile, both for rolling down and for bonding to the steel backing. A rectangular billet 25 mm thick is cast as previously and again cut into 600 mm lengths with the edges removed by sawing. The surfaces of the billet are machined so as to reduce its thickness to 19 mm and the billets annealed at 490° C. for 16 hours. The billet is then rolled down to 7.7 mm in 5 stages, these typically being 19 mm, 15 mm, 12 mm, 9 mm and 7.7 mm. At this stage, the strip is annealed for a second time for 2 hours at 270° C. The surfaces are then abraded using a belt linisher and a 0.81 mm thick foil of aluminium which has been vapour degraded and scrachbrushed is clad on to one side taking the overall thickness to 8.15 mm. This is rolled down to 0.89 mm, the stages being 4.8 mm, 3.4 mm, 2 mm, 1.5 mm, 1.1 mm and finally 0.89 mm. The strip is then trimmed and bonded to the steel backing after both the aluminium surface and the steel have been vapour degreased, the aluminium has been scratch brushed and the steel surface belt-linished. .

The finished strip can then be formed into bearings as required, and optionally the bearings can be electroplated should this be desired.

One of the features of alloys in accordance with the invention is the fact that they can be finished by bore broaching. It is believed that the maximum silicon content for this is about 8%, otherwise the alloy is too hard. Bore broaching is a technique in which a broach which is a circular edged cutting tool is pushed through the surface of the finished bearing without rotation prior to plating to size. The tool may have from three to eight, typically five cutting edges; the first would be for rough cutting and the last would be a finishing cutter. The cutters may be made of either high speed tool steel or tungsten carbide. In addition, the surfaces of the cutters may be coated with titanium nitride or a similar coating to improve operating life.

Obviously, numerous modifications and variations of the present invention are possible in the light of the above teachings. It is therefore to be understood that within the scope of the appended claims, the invention may be practised otherwise than as specifically described herein.

What is claimed as new and desired to be secured by Letters Patent of the United States is:

1. An alloy consisting essentially of from 3 to 5% by weight particulate silicon of a maximum particle size of 20 microns, from 8 to 20% by weight tin in continuous phase, about 60% of said silicon being incorporated in the tin phase and from 0.2 to 2% by weight copper, the balance being aluminium in continuous phase.

2. An alloy according to claim 1 comprising 4% by weight silicon, 10% by weight tin, and 1% by weight copper, the balance being aluminium.

3. An alloy according to claim 1 further incorporating 0.05% by weight of a component selected from the group consisting of strontium and sodium.

4. A composite strip for a plain bearing comprising a metal backing and a lining of an alloy as described in claim 1.

5. A composite strip according to claim 4 wherein said metal backing comprises a steel backing, said strip further including a layer of aluminium or aluminium alloy between said backing and said lining.

6. A composite strip according to claim 4 further including an overlay on said lining, said overlay comprising an alloy selected from the group consisting of lead/tin, lead/tin/copper, tin/copper, tin/antimony, tin/copper/antimony and lead/tin/copper/antimony.

7. A composite strip according to claim 6 further including an interlayer between said lining and said overlay, said interlayer comprising a metal selected from the group consisting of nickel, iron, silver, cobalt, copper/zinc and copper/tin.

8. A method of manufacturing a composite strip for a plain bearing which comprises:

casting a billet of a bearing alloy consisting essentially of from 3 to 5% by weight particulate silicon of a maximum particle size of 20 microns, from 8 to 20% by weight tin in continuous phase and from 0.2 to 3% copper, the balance being aluminium in continuous phase;

annealing said billet for a first time;

cold rolling said annealed billet for a first time to form a strip;

cladding one side of said strip with a layer of aluminium;

cold rolling said strip for a second time, down to the required final thickness; and bonding said aluminium layer of said strip to a steel backing to form said composite strip.

9. A method according to claim 8 further including the steps of forming said composite strip to the desired shape and finishing the bearing surface by a bore broaching technique.

10. A method according to claim 9 further including the step of applying a soft overlay to said finished bearing surface, said overlay being an alloy selected from the group consisting of lead/tin, lead/tin/copper, tin/copper, tin/antimony, tin/copper/antimony, and lead/tin/copper/antimony.

11. A method according to claim 10 further including the step of applying an interlayer to said finished bearing surface, prior to the application of said soft overlay, said interlayer comprising a metal selected from the group consisting of nickel, iron, silver, cobalt, copper/zinc and copper/tin.

* * * * *

UNITED STATES PATENT AND TRADEMARK OFFICE
CERTIFICATE OF CORRECTION

PATENT NO. : 4,696,867
DATED : September 29, 1987
INVENTOR(S) : Barry J. Eastwood It is certified that error appears in the above-identified patent and that said Letters Patent is hereby corrected as shown below:

Column 2, line 56:
 "hearings" should be --bearings--
Column 4, line 59:
 "8.15mm" should be --8.51mm--

Signed and Sealed this

Seventeenth Day of May, 1988

Attest:

DONALD J. QUIGG

*Attesting Officer*       *Commissioner of Patents and Trademarks*